Patented Nov. 24, 1931

1,833,086

UNITED STATES PATENT OFFICE

EDMUND B. MIDDLETON, OF NEW BRUNSWICK, NEW JERSEY, ASSIGNOR TO DU PONT FILM MANUFACTURING CORPORATION, OF WILMINGTON, DELAWARE, A CORPORATION OF DELAWARE

INK FOR PHOTOGRAPHIC FILMS

No Drawing. Application filed April 24, 1928. Serial No. 272,564.

This invention relates to chemical inks and particularly to inks for marking and printing on cellulose ester bodies such as motion picture films of cellulose ester, e. g. cellulose nitrate or acetate. Although not restricted thereto, it finds particularly valuable use in the application of indicia, e. g. footage numbers, to film especially in those cases where the indicia are to be applied by an automatic numbering machine.

A major object of the invention is to provide an ink which, when applied, will remain permanent against abrasion and the attack of photographic developing and washing fluids, and will not have a deleterious effect on the sensitized photographic emulsion, either by contact therewith or by emanations from the ink. A further object is to provide an ink which will dry rapidly on the film but yet will print clearly without blurring and will not gum on the type, and will be at least partially absorbed into the film, but will not shrink the perforations of the film. A further object is to provide an ink which will not be removed by alcohol, wherefor the film may be washed with alcohol without removal of the indicia. A further object is to provide an ink that will properly adhere to protein-coated film. To these ends, and also to improve generally on inks of the general character indicated, the invention consists in the various matters hereinafter described and claimed.

Without restricting the invention thereto, the following will serve as examples of inks of composition in accordance with the invention:—

|     |                                    | Grams |
|-----|------------------------------------|-------|
| (1) | a. Nigrosine                       | 120   |
|     | b. Cellulose nitrate               | 120   |
|     | c. Monoethyl ether of ethylene glycol | 1800 |
| (2) | a. Victoria blue base              | 120   |
|     | b. Shellac                         | 100   |
|     | c. Monoethyl ether of ethylene glycol | 1250 |
| (3) | a. Lamp black                      | 120   |
|     | b. Cellulose nitrate               | 150   |
|     | c. Monoethyl ether of ethylene glycol | 1500 |
| (4) | a. Nigrosine base                  | 120   |
|     | b. Cellulose nitrate               | 120   |
|     | c. Diacetone alcohol               | 2400  |
| (5) | a. Lamp black                      | 120   |
|     | b. Sandarac                        | 180   |
|     | c. Diacetone alcohol               | 1800  |

In the above, it will be noted that each composition comprises coloring matter (a), a thickener (b), and a cellulose ester solvent (c). In making up, the dyestuffs may be dissolved in the solvent, and filtered, and the thickener added. Pigments should be ground with the solvent, as in a ball mill. For the lamp black may be substituted other inert pigments, and for the mentioned dyes may be substituted others; and, also, of course, pigments may be substituted for the dyes, and vice versa. Dyes have the advantage of being easily incorporated in the solvents, while pigments must be ground with the solvents; if a dye is used, it should be one without sensitizing or desensitizing properties. While gums, such as shellac, sandarac, dammar, etc., may be used, as indicated, to give body and viscosity to the ink, so that it will be taken up by the type and will give a good impression which will not rub off, there can be used as a thickener (as also indicated) a cellulose ester, e. g. the nitrate or acetate; and I prefer to use such an ester, particularly the nitrate, as the ester gives an ink somewhat more adhesive than do gums. Furthermore, an ester is superior in cases where the printed film is to be washed with alcohol since, unlike the gums, the ester is substantially insoluble in alcohol.

Various solvents may be used, such as amyl acetate, ethyl lactate, etc., but I prefer the solvents monoethyl ether of ethylene glycol and diacetone alcohol, as above mentioned, for various reasons:—They are excellent solvents for dyes, are good solvents for gums and cellulose nitrate, and diacetone alcohol is a good solvent for cellulose acetate also, and they have highly desirable drying properties.

In cases where the ink is to be applied to films having a coating of a protein, as albumen, gelatin, casein, keratin, and vegetable proteins, such as zein, as in the case where indicia, as footage numbers, are to be applied to the base side of a film having a casein backing, inks having the monoethyl ether of ethylene glycol are particularly useful as this compound penetrates proteins, as casein, etc., and so will penetrate the backing; and where the film base is of cellulose nitrate, it can penetrate that as well. Thus, in compositions such as "1" and "3", is exemplified an ink which will not be removed by alcohol, will penetrate a protein backing and will penetrate cellulose nitrate film base.

The proportions of the ingredients in the above formulas may be greatly varied, e. g. holding the coloring matter constant in each case, the amount of thickener may be from one-half to three times the amount given, i. e. 50 to 540; and, as for the solvent, it is possible to use from one-half to four or five times the amounts given, i. e. 625 to 9600 to 12000. A thin ink is generally better for use with a printing machine which supplies ink to the type by some species of automatic feed, and a thicker ink being generally better for a machine inked by a rubber roller.

I claim:

1. An ink for printing upon unexposed and undeveloped cellulose ester motion picture film, consisting of monoethyl ether of ethylene glycol, nigrosine base, and a cellulose nitrate thickener, said ink being insoluble in alcohol after it is applied to said film.

2. An ink for printing upon unexposed and undeveloped cellulose ester motion picture film consisting of the following ingredients in substantially the stated proportions: monoethyl ether of ethylene glycol 15, nitrocellulose thickener 1, nigrosine base 1, said ink being insoluble in alcohol after it is applied to said film.

3. An ink for printing upon unexposed and undeveloped cellulose ester motion picture film consisting of a solvent selected from the group consisting of monoethyl ether of ethylene gycol and diacetone alcohol, coloring matter and a cellulose ester thickener, said ink being insoluble in alcohol after it is applied to said film.

In testimony whereof, I affix my signature.

EDMUND B. MIDDLETON.